Oct. 18, 1938. J. L. CLARKSON Re. 20,883

POWER LOADER

Original Filed July 23, 1930 3 Sheets-Sheet 1

Inventor:
JOHN L. CLARKSON,
By John N. Brunnigs
His Attorney.

Oct. 18, 1938. J. L. CLARKSON Re. 20,883
POWER LOADER
Original Filed July 23, 1930 3 Sheets-Sheet 2
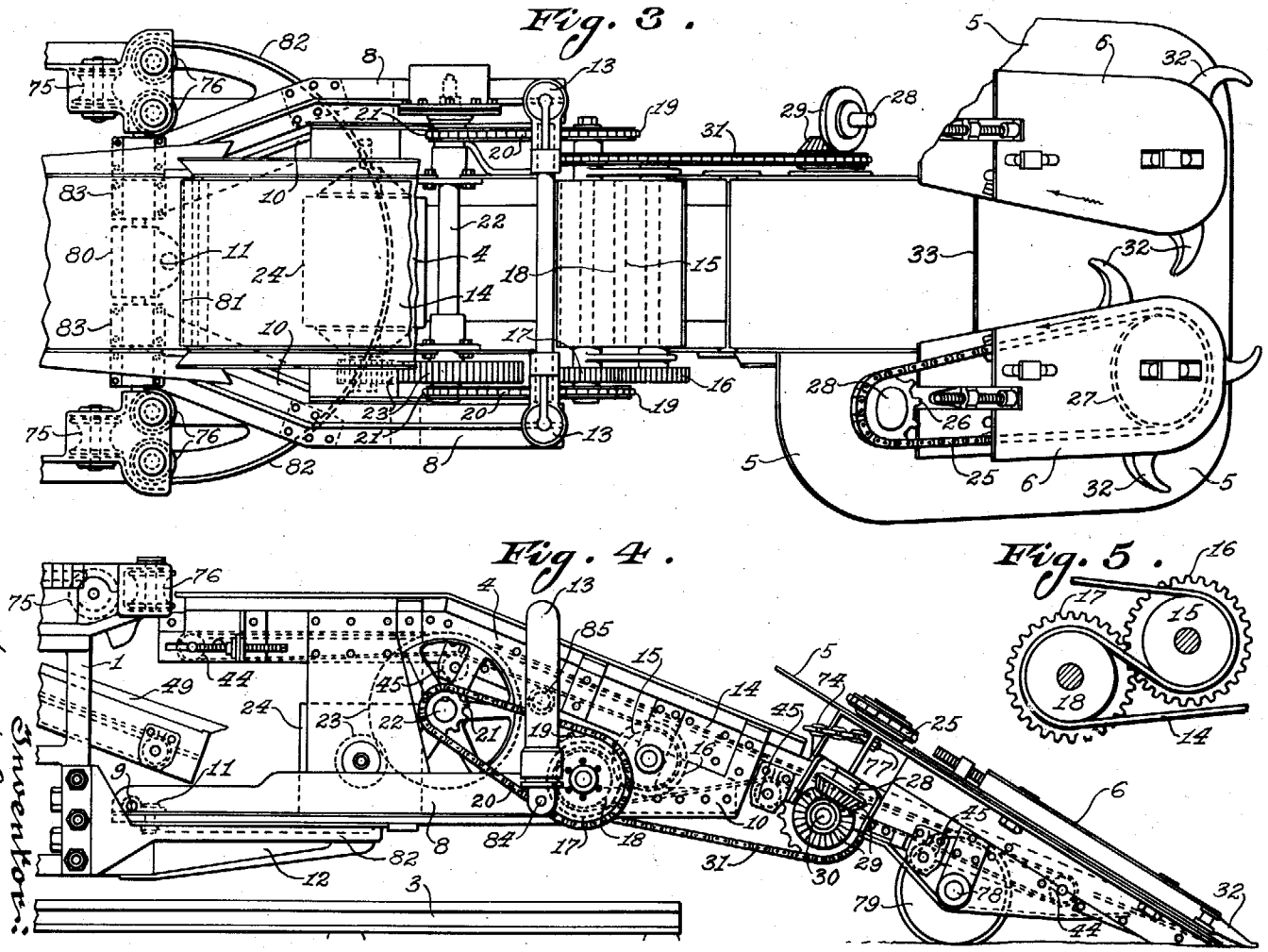
Inventor:
JOHN L. CLARKSON,
By John N. Brenning
His Attorney.

POWER LOADER

Original Filed July 23, 1930 3 Sheets-Sheet 3

Inventor:
JOHN L. CLARKSON,
By John W. Brumiga
His Attorney.

Reissued Oct. 18, 1938

Re. 20,883

UNITED STATES PATENT OFFICE 20,883

POWER LOADER

John L. Clarkson, Nashville, Ill.

Original No. 1,904,355, dated April 18, 1933, Serial No. 470,031, July 23, 1930. Application for reissue February 28, 1938, Serial No. 193,091

11 Claims. (Cl. 198—8)

This invention pertains to power loading machines and more particularly to that type of machine used in mines for loading coal and the like into mine cars.

The type of machine here involved is equipped with an elevating conveyor at its front end which elevates the material to be loaded and, after carrying it over the top of the machine, delivers it to a loading conveyor which in turn delivers it to the mine cars. A gathering device is provided at the front end of the elevating conveyor operating to gather the material from the mine floor or from a pile of material and move it onto the elevating conveyor. Such a gathering device should be able to handle all kinds of material from comparatively small granular or egg-size material to large lumps. Such a device should preferably be capable also of digging so-called "tight" coal, i. e., coal which has just been "shot down" and is more or less cracked or shattered but still standing.

In the regular operation of a machine of this character the demands of production usually require that it be operated at its maximum loading capacity. The usual practice is, therefore, to drive the gathering head into the pile of material until a major portion of the head is submerged in the pile. The gathering devices thus are required to work under the pile of material and drag the same out and onto the conveyor, and must then extricate themselves from the material and return to a new attack.

One of the objects of this invention is to provide a loading machine of this type which will be capable of loading an increased quantity of material in a given time.

Another object is to provide a machine which will load coal which has been "shot-down" directly onto mine cars and which will be capable of continuing such loading without interruption.

Another object is to provide improved gathering mechanism for a loader of this type which will move the material from the gathering point and deliver it to a suitable conveyor in a positive manner and in such a way that the gathering mechanism does not interfere with the delivered material.

Another object is to provide a loader of this type with a flat belt conveyor together with means for effectively driving such conveyor.

Another object is to provide a loader in which the gathering mechanism can be swung from side to side and the machine as a whole moved toward or away from the material to be loaded and to provide control devices by means of which all these operations may be accomplished in a simple and expeditious manner.

Further objects will appear from the following description taken in connection with the accompanying drawings, in which:—

Figure 3 is a plan view of the forward half of the loader shown in Fig. 1;

Figure 4 is a side elevation of Fig. 3; and

Figure 5 is an enlarged detail of the belt drive;

Figure 1:
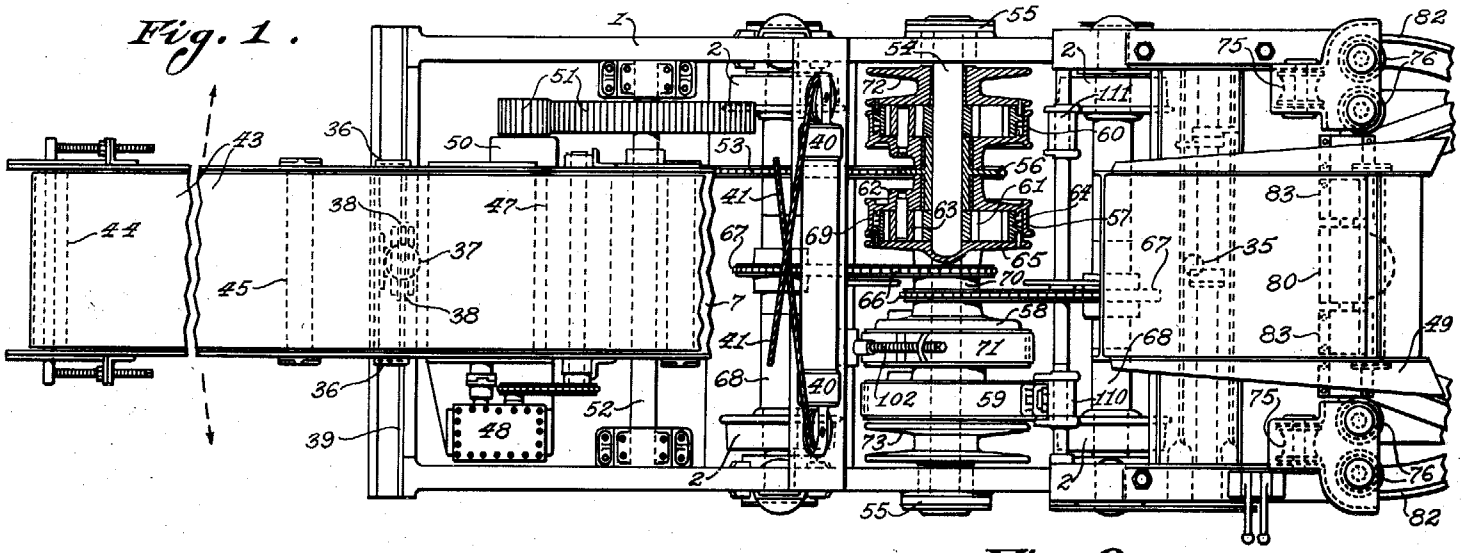
Figure 1 is a plan view of the rear half of a loader embodying this invention.

Referring to the drawings, 1 designates a truck frame on which the entire machine is carried. In the machine illustrated this frame is equipped with track wheels 2 adapted for traveling on rails 3. The frame 1 may also be mounted for traveling on a caterpillar traveling device in order that it may operate in places where no tracks have been laid. Extending forwardly from the truck 1 is an elevating conveyor designated generally by the numeral 4. This conveyor is equipped at its forward end with a gathering head 5 which has mounted thereon gathering mechanism designated generally by the numeral 6. The conveyor 4 is adapted to carry the material rearwardly and deliver it to the depressed forward portion of a conveyor designated generally by the numeral 7 which is mounted on the frame 1 and which is arranged to extend rearwardly thereof in order to deliver its material to mine cars or other receivers which may be brought up to the rear of the machine. Suitable means for driving the various mechanisms are provided as will be explained more in detail hereinafter.

Projecting forwardly from the front end of the frame 1 is a supporting bracket 12 which carries a pivot shaft 9. The shaft 9 is itself pivoted to the bracket 12 by means of a fitting 80 which has a bore adapted to receive the shaft 9 and which has a forward extension perforated to receive a pivot pin 11 which passes downwardly thru a cross web 81 forming a part of the bracket 12. By means of this connection the shaft 9 is pivoted for horizontal movement on the bracket 12.

A bracket 8 has a pair of rearwardly extending arms secured to the ends of the shaft 9. The bracket 8 extends forwardly from the pivot 11 and rests upon an upstanding ridge or flange 82 which extends around the curved forward edge of the bracket 12. The curve of this edge is circular having its center at the pivot 11. Accordingly, the bracket 8 is pivoted for horizontal movement on the pivot 11 during which movement the bracket 8 slides on the rim of the bracket 12.

Nested within the arms of the bracket 8 is a similarly formed inner bracket 10 having rearwardly extending arms which are hinged at 83 on the shaft 9. The forward end of the bracket 10 carries the conveyor 4 which is rigidly attached thereto in any suitable manner.

Pivotally supported at 84 at the forward end of the bracket 8 are elevating jacks 13. There is one of these jacks mounted on each side of the machine as shown in Fig. 1. The elevating portion of each jack is pivoted at 85 to the bracket 10. Accordingly, by operating the jacks 13 the bracket 10 is elevated relatively to the brackets 8, pivoting on the shaft 9 so as to raise the front end of the conveyor and its gathering shoe 5.

Figure 6:
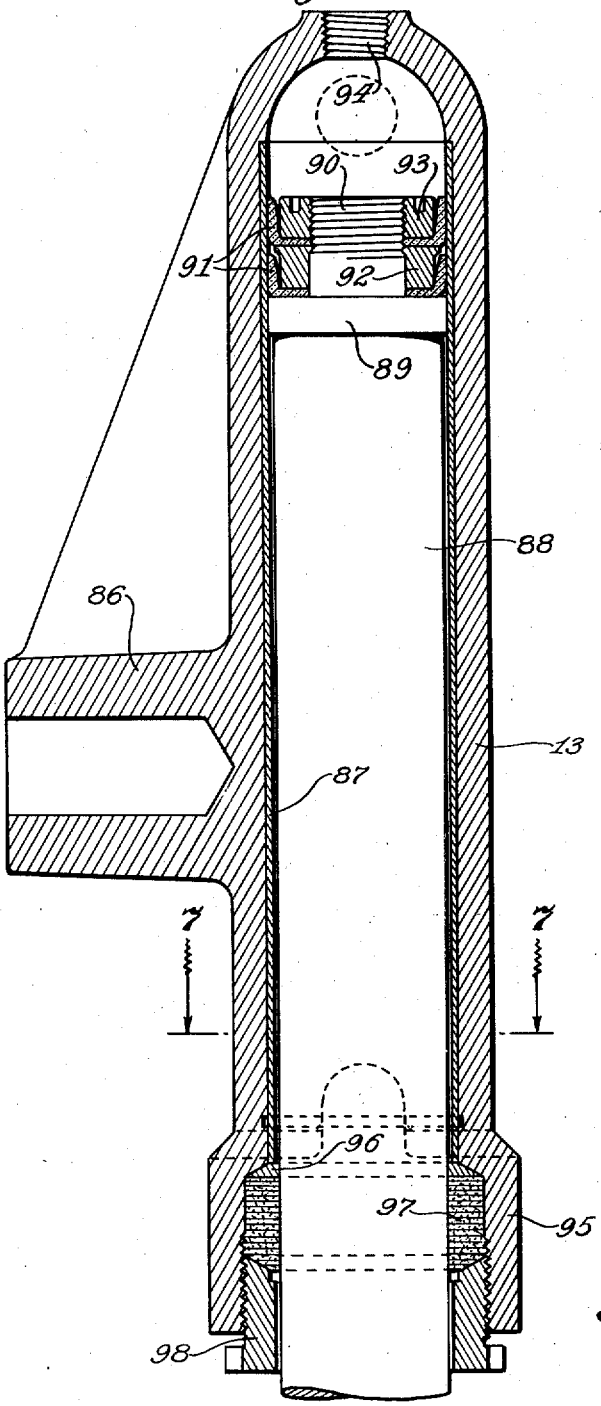
Figure 6 is a vertical longitudinal section of an elevating jack constructed in accordance with this invention.
Figure 7:
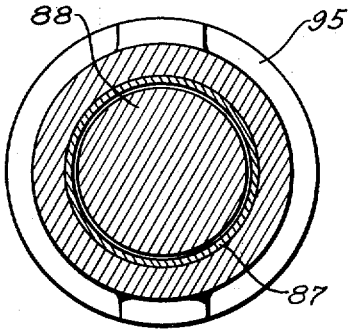
Figure 7 is a section on line 7—7 of Fig. 6.
Figure 8:
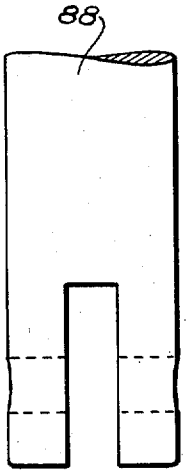
Figure 8 is a continuation of the lower end of Fig. 6.

The elevating jacks 13 are of special construction as illustrated in Fig. 6. The hollow casing 13 is provided with a base 86 adapted to receive the pivot 85. The casing 13 may be lined with a sleeve 87 of bronze or other suitable material adapted to provide an inner wearing surface. Mounted to slide in the casing 13 is a plunger 88 of somewhat smaller diameter than the bore of the sleeve 87 and having an enlarged head 89 adapted to fit snugly in the bore of the sleeve 87. The upper end of the plunger 88 is provided with a stud 90 on which are mounted a pair of packing washers 91 preferably of cupped shape. The lower of these washers rests against the head 89 and the upper one against a spacer 92 being held in place by a nut 93 on the stud 90. The cupped washers 91 provide a packing adapted to seal the upper part of the chamber within the casing to which oil or other liquid may be supplied thru a port 94 whereby the necessary hydraulic pressure for operating the jack may be provided.

The lower end of the casing 13 has an enlarged portion 95 adapted to receive a stop ring 96 whose inner bore is fitted to the plunger 88. A suitable packing 97 bears against the ring 96 and is held in place by a nut 98 screwed into the portion 95 of the casing and adapted to put the packing 97 under pressure so as to form an effective seal around the plunger.

It will be noted that the ring 96 together with the packing 97 and the nut 98 are put in place after the plunger has been inserted in the casing. The ring 96 is fitted to the shank of the plunger so that its bore is smaller than the head 89. Accordingly, this ring forms a stop adapted to prevent the plunger being drawn entirely out of the casing. As the ring 96 rests upon the packing 97 which usually is somewhat yielding, the ring 96 so supported provides a yielding stop for the plunger adapted to absorb shocks and to prevent breaking the jack in case of vigorous operation thereof.

It will be noted that the construction above described provides connections whereby the forward conveyor 4 may be raised and lowered on the frame 1 pivoting on the shaft 9. Laterally swinging movement on the pivot 11 is also provided during which movement the bracket 8 slides laterally upon the bracket 12. Means for accomplishing this lateral movement will be described hereinafter. The jacks 13 may be operated by supplying oil thereto under pressure in any suitable manner well known in the art. A suitable oil pump for this purpose is carried on the machine.

The conveyor 4 comprises a traveling belt 14. This is an ordinary flat belt which may be of leather, rubber or similar material having a substantially smooth surface. Flat belts of this type have not been successful heretofore when applied to a conveyor of this type whereby heavy material, such as coal or the like must be carried up an inclined path which is fairly steep. The failure of these belts in the past has been due to the difficulty of driving the belt positively when carrying such a heavy load.

In accordance with the present invention a plurality of driving pulleys is employed for driving the belt 14. As shown in Fig. 4, a pulley 15 has fixed to its shaft a gear 16 engaging a corresponding gear 17 on the shaft of another pulley 18. The shaft of the pulley 18 also carries a sprocket 19 connected by a chain 20 with a sprocket 21 on a shaft 22 connected by gearing 23 to be driven by a motor 24. The pulleys 15 and 18 are closely adjacent one to another, are of the same diameter and are geared together so as to be positively driven at the same peripheral speed. The belt 14 passes by a series of reverse bends over both these pulleys in succession. The arrangement is also such that the arc of contact of the belt at each of these pulleys is greater than 180°. This arrangement forms a positive drive for the belt 14 which renders it possible to carry a greatly increased weight of material on the elevating flight of the belt without danger of the belt slipping on the driving pulleys. By increasing the number of driving pulleys, a sufficiently positive driving engagement can be obtained to pull practically any load within the tension capacity of the belt.

Mounted at the forward end of the conveyor 4 is the gathering head 5. This may have the form of a flat plate having its forward end depressed so as to form a shovel which may be inserted under a pile of material by driving the same against the pile and providing upper parts or wings formed by bifurcating the plate as shown in Fig. 3.

In accordance with this invention the head 5 is mounted to have an upward inclination relatively to the slope of the conveyor belt 14, but the head is arranged in fixed upwardly spaced relation to the conveyor in the sense that the relation between the two is established so as to maintain the head spaced with respect to the conveyor, particularly at the upper parts or wings.

Mounted on the head 5 and so as to move upwardly at the same angle as said head is the gathering mechanism 6. This mechanism comprises a pair of gathering chains 25, each passing over a driving sprocket 26 on one of the wings, and a lower guide 27. The driving sprocket 26 is mounted on a short inclined shaft 28 connected by bevelled gearing 29 to a transverse shaft 30 driven by a chain 31 from the shaft of the conveyor driving pulley 18.

The gathering chains 25 move in the direction indicated by the arrows in Fig. 3 and the chains are armed with gathering devices in the form of hooks, cutters or picks 32. These devices, therefore, move in a path determined by the position of the head 5 with reference to the conveyor 4, so that the conveyor moves in a path spaced from that of the gathering means and in the particular embodiment shown the path of the devices lies in a plane inclined upwardly to the plane of the conveyor. The gathering head and the gathering mechanism thereon also overlaps the conveyor particularly in the region of the wings, and a way extends between the gathering chains which define such way.

In operation when the shovel is inserted under a pile of material the series of hooks, cutters or picks 32 with which the chains 25 are armed and which extend beyond the shovel, assists in working the material away from before the entering edges of the shovel so that the head may be worked under the pile of material. The picks or cutters 32 also move upwardly along the inclined path formed by the slope of the head 5 so as to gather the material between the two chains and move the same upwardly on the head along the way between the chains.

At a suitable point over the lower end of the conveyor belt 14 the shovel is provided with a delivery edge 33 over which the material drops onto the belt 14.

It will be noted that on account of the increased slope of the path of the gathering chains relatively to that of the belt conveyor 14, the cutters or picks 32 move away from said belt as they move upwardly, being spaced a substantial distance thereabove at the upper end of their travel where they begin to turn outwardly about the shaft 28. By this movement the cutters or picks are carried clear of the material which has been delivered to the belt. Accordingly, there is no tendency for the picks to sweep part of the material off the upper part of the head during their outward movement about the shaft 28. In other words the cutters are moved clear of the delivered material in a vertical direction as the material is carried away on the belt 14. While the spacing of the gathering head relative to the conveyor should be sufficient to cause the picks to clear the material lumps, it is only necessary that the spacing be sufficient for the picks to clear such lumps as are liable to be swept off.

It will also be noted that the gathering chains are more widely separated at their upper ends than at their lower ends. This provides room between the chains for the material to accumulate in a compact form so as to spread the same over the width of the belt 14 and the capacity of the machine is increased accordingly. This is also of advantage in such cases as often occur where the shovel and in fact the entire head works its way a considerable distance under the pile of material to be loaded whereupon the pile caves in upon the machine. In such a case the caving material will fall upon the head 5 and the belt 14. The belt will immediately carry such material away while that part that falls between the gathering chains will be moved up and delivered to the belt. The flaring form at this portion of the mechanism prevents any possibility of the jamming of the fallen material which might make it necessary to suspend operation until such material can be worked loose by hand.

The frame of the conveyor 7 is hinged at 34 for up and down movement and is pivoted at 35 for horizontal swinging movement so that the conveyor may be adjusted to deliver its material at any desired point. Since the head has an established upwardly spaced relation to the conveyor, the two move together without changing that relation and without changing the spaced relation of the gathering mechanism to the coal moving part of the conveyor. A bracket 36 on the rear portion of the frame 7 carries a hydraulic jack 37 for raising and lowering the rear end of the conveyor. This jack is equipped with one or more rollers 38 running on a track 39 on the frame 1 so as to provide for lateral movement of the conveyor. A pair of oppositely moving jacks 40 mounted horizontally on the frame 1 engage cables 41, each of which is connected to a bracket 42 on the side of the conveyor frame 7. The operation of the jacks 40 acts to swing the conveyor laterally on its pivot 35.

The conveyor 7 comprises a flat belt 43 passing over pulleys 44 and 45 at opposite ends of the conveyor frame. This belt is driven by a pair of driving pulleys 46 and 47 geared together and driven by a motor 48. The belt 43 and the means for driving the same are similar in all respects to the belt 14 and its driving means as already described. The forward end of the conveyor 7 may be provided with a hopper rim 49 and is positioned beneath the rear end of the conveyor 4 so that the material is delivered by the conveyor 4 to the conveyor 7 and is carried by the latter conveyor rearwardly to be deposited in mine cars or other suitable receivers for disposing of the material in the desired manner.

The main drive of this machine is derived from a motor 50 mounted on the frame 1 and connected by suitable gearing 51 to a shaft 52. The latter shaft is connected by a chain 53 to drive a countershaft 54 extending transversely of the frame 1 and journaled in bearings 55 therein. The power for manipulating the machine is derived from the shaft 54. The chain 53 engages a sprocket 56 which is keyed to the shaft 54 so that said shaft is driven continuously.

A series of planetary-gear clutches is arranged to connect the shaft 54 for driving the wheels 2 in order to move the machine bodily and for operating means for swinging the front conveyor 4 laterally. These clutches are designated generally by the numerals 57, 58, 59 and 60. As these clutches are all alike only the clutch 57 will be described in detail.

This clutch comprises a central gear 61 keyed to the shaft 54. A spider 62 loosely mounted on the shaft 54 carries a plurality of intermediate gears 63, only one of which appears in the drawings. These intermediate gears engage the gear 61 and also an external gear 64 secured to a spider 65 keyed to a sleeve 70 loose on the shaft 54 and carrying sprockets 66 connected to sprockets 67 on the axles 68 of the wheels 2. The spider 62 is provided with an outer drum 69 to which a brake band 71 may be applied. By tightening said brake band the spider 62 is held stationary so that the gear 61 is caused to drive the gear 64 thru the intermediate gears 63. This drives the sleeve 70 which in turn drives the wheels 2. The clutch 57 is so connected to the sleeve 70 as to drive the wheels in one direction while the clutch 58 is also connected to the sleeve 70 but in such a way as to drive the wheels 2 in the reverse direction when its brake band is tightened. Thus by manipulating the brake band 71 on one or the other of the clutches 57 and 58, the machine as a whole may be driven forward or back along the tracks 3.

In a similar manner the clutch 60 is connected to drive a winding drum 72 while the clutch 59 is connected to drive a similar drum 73. Arranged to be wound upon the drums 72 and 73 are cables or chains 74. These pass up over horizontal pulleys 75 and between vertical guide pulleys 76 and are connected at 77 (Fig. 4) to the shoe 5. There is one of these chains at each side of the machine. Accordingly, by operating one or the other of the clutches 59 or 60 either of these chains may be tensioned so as to pull the forward conveyor toward that side of the machine. It is also possible by pulling on both of these chains at the same time to elevate the front conveyor.

It will be noted that practically all the movements necessary for manipulation of this machine are the forward and rearward movement of the entire loader and the lateral swinging movement of the front conveyor. Power for all these movements is derived from the same shaft 54 and means for manipulating the connections are all the same type, namely, planetary-gear clutches. Accordingly, simple manipulating means may be provided so that these movements may be accomplished easily by an unskilled operator.

Figure 2:
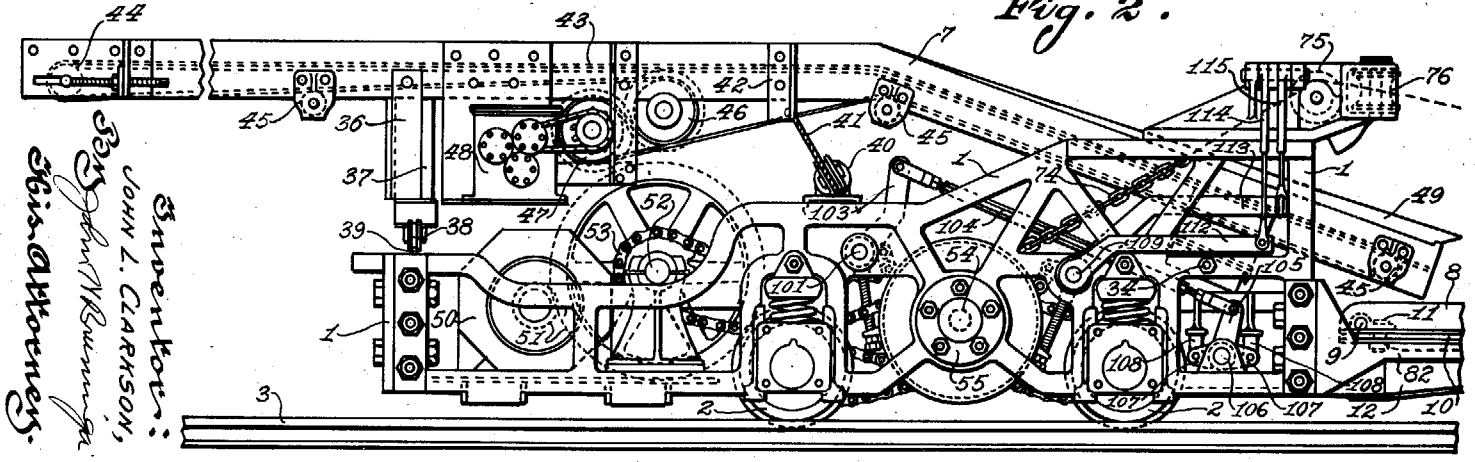
Figure 2 is a side elevation of Fig. 1.

The connections for effecting such manipulation are shown in Fig. 2. A shaft 101 mounted in the frame 1 may be provided with cranks connected by adjustable links 102 to operate the clutches 57 and 58. Only one of these operating connections is shown in Fig. 1 since the other drum is shown in section. By rocking the shaft 101 in one direction, one of these clutches will be operated while rocking said shaft in reverse direction will operate the other clutch. The shaft 101 has fixed thereto an arm 103 connected by a link 104 to an arm 105 on a rockshaft 106 which has fixed thereto a pair of oppositely extending arms 107 which carry pedals 108 at the operator's station. The numeral 109 indicates one of a pair of concentric shafts journaled in the frame 1 and having operating connections 110 and 111 of any suitable type adapted to operate the clutches 59 and 60, respectively. These shafts carry levers 112 and 113 connected to operating handles 114 and 115 at the operator's station. By operating the handles 114 and 115 and the pedals 108 in a proper manner the operator may cause the machine to perform in any desired manner.

As a convenience in transporting machine, a transverse shaft 78 is mounted just below the shovel 5 and a pair of traveling wheels 79 is arranged to be detachably mountable on the shaft 78 to support the forward end of the conveyor 4 on the rails 3 while traveling. The wheels are of such size that the shoe 5 is elevated a sufficient distance from the ground when supported thereby.

It will thus be seen that this invention accomplishes its objects. Since the picks extend beyond the shovel part of the head, they are able to attack the coal and move it in a path or way between the chains onto the conveyor at the front of the machine and even insure its delivery on to the conveyor. These picks move along the conveyor in a path along the head, and along the way defined by the gathering means, and this way is an unobstructed one to permit unobstructed movement of the material along the way. The picks thereafter move laterally out of the way and away from the conveyor to their return paths. The conveyor moves in a path which is spaced vertically from that of the picks or gathering means a maximum distance in the zone where the gathering means moves out of the way and away from the conveyor which, in this particular embodiment, is accomplished by the upward inclination of the head and the gathering means thereon with respect to the conveyor. The arrangement of these picks, moving as they do in paths, whose spacing vertically above the conveyor at the points where these picks turn is sufficient to free the material lumps, enables the speed of the machine to be increased without sweeping the coal off of the upper parts of the head. This is important, because of the fact that where these picks turn at the upper parts of the head, their tips move at a speed which is several times their speed during their upward travel in a straight line before they reach their turning points. The rising of the picks is not accomplished by a quick upward flip, but the movement is a gradual one in a plane inclined or spaced upwardly with respect to the conveyor; accordingly, there is no tendency to throw the coal upwardly as would be the case if these picks were moved by an upward flip. Since the head has an established relation to the conveyor, the two parts can be moved together vertically to rise above the bottom ledges encountered in mining. It will be self-evident that if the head did not have an established relation to the conveyor, but were pivoted to swing vertically thereto, then when such a head would be swung vertically to clear such ledges, the spaced relation between the head and the gathering mechanism thereon relative the conveyor would be disturbed, particularly at the upper parts of the head where the picks turn, so that the advantages of this invention would not then thereby be attained. It will also be noted that the way between the chains from the front to even where the picks turn, is left free and unobstructed for the coal to not only be delivered to the conveyor, but so as to insure its delivery, and finally to permit the coal to pass from the conveyor at the front of the machine to the delivering conveyor.

It will be understood that various changes may be made, within the scope of the appended claims, without departing from the spirit of this invention; it is, therefore, to be understood that this invention is not to be limited to the specific construction shown and described.

Having thus described the invention what is claimed is:

1. A loading machine of the character described, comprising, an elevating conveyor at the front of the machine extending upwardly and rearwardly, a gathering head overlapping said conveyor and having an unobstructed way therealong, and gathering means moving in a path along said head and operable to progress the material along said way in the path of said gathering means and on to said conveyor, said gathering means thereafter moving laterally out of said way, said conveyor moving in a path spaced vertically from that of said gathering means a maximum distance in the zone where said gathering means moves out of said way and sufficiently to free the material lumps against being swept off the conveyor and the head.

2. A loading machine of the character described, comprising, an elevating conveyor at the front of the machine extending upwardly and rearwardly, a gathering head overlapping said conveyor and having an unobstructed way therealong, and gathering means moving in a path along said head and operable to progress the material along said way in the path of said gathering means and on to said conveyor, said gathering means then turning laterally out of said way to a return path, said conveyor moving in a path deviating vertically from that of said gathering means a maximum distance in the zone where said gathering means moves out of said way and sufficiently to cause said gathering means to clear the material lumps at the turning point against being swept off the conveyor and the head.

3. A loading machine of the character described, comprising, an elevating conveyor at the front of the machine extending upwardly and rearwardly, a gathering head overlapping said conveyor and having an unobstructed way therealong, and gathering means having picks movable along said way in a path extending along said conveyor to progress the material along said way and on to said conveyor, the picks then moving laterally out of said way to a return path, the path of said picks at their outward movement being spaced above said conveyor a maximum distance and sufficiently to clear the material lumps against being swept off the conveyor and the head.

4. A loading machine of the character described, comprising, an elevating conveyor at the front of the machine extending upwardly and rearwardly, a gathering head overlapping said conveyor and having an unobstructed way therealong, and a gathering chain having picks movable in a path leading inwardly of said head beyond the end thereof, then upwardly along said way and extending along said conveyor to progress the material thereonto, said picks then moving laterally out of said way to a return path, the path of said picks at their outward movement being spaced above said conveyor a maximum distance and sufficiently to cause said picks to clear the material lumps against being swept off the conveyor and the head.

5. A loading machine of the character described, comprising, an elevating conveyor at the front of the machine extending upwardly and rearwardly, a gathering head overlapping said conveyor and having an unobstructed way therealong, and a pair of gathering chains having picks movable in paths leading inwardly toward each other beyond the end of said head, then upwardly along said way and extending along said conveyor to progress the material thereonto, said picks then moving laterally out of said way away from each other to return paths, the paths of said picks at their outward movements being spaced above said conveyor a maximum distance and sufficiently to cause said picks to clear the material lumps against being swept off the conveyor and the head.

6. A loading machine of the character described, comprising, a machine frame, an elevating conveyor at the front of the machine frame and extending upwardly and rearwardly, a gathering head overlapping said conveyor and arranged in fixed upwardly spaced relation thereto, whereby said head and conveyor are movable as a unit on the frame, said head having an unobstructed way therealong, and gathering means mounted on and moving in a path along said head and operable to progress the material along said way in the path of said gathering means and on to said conveyor, said gathering means thereafter moving laterally out of said way, said conveyor moving in a path spaced vertically from that of said gathering means a maximum distance in the zone where said gathering means moves out of said way and sufficiently to free the material lumps against being swept off the conveyor and the head.

7. A loading machine of the character described, comprising, a machine frame, an elevating conveyor at the front of the machine frame and extending upwardly and rearwardly, a gathering head overlapping said conveyor and arranged in fixed upwardly spaced relation thereto, said head having an unobstructed way therealong, whereby said head and conveyor are movable as a unit on the frame, and a pair of gathering chains mounted for movement on said head and having picks movable in paths leading inwardly toward each other beyond the end of said head, then upwardly along said way and extending along said conveyor to progress the material thereonto, said picks then moving laterally out of said way away from each other to return paths, the paths of said picks at their outward movements being spaced above said conveyor a maximum distance and sufficiently to cause said picks to clear the material lumps against being swept off the conveyor and the head.

8. A loading machine of the character described, comprising, an elevating conveyor at the front of the machine extending upwardly and rearwardly, a gathering head overlapping said conveyor and arranged in upwardly inclined relation thereto, and means on said head for gathering the material thereon and for moving the same therealong and onto said conveyor, said gathering means thereafter moving laterally away from said conveyor, said head being spaced above said conveyor a maximum distance in the zone where the gathering means moves laterally away from the conveyor and sufficiently to permit the material lumps to drop out of the path of said gathering means.

9. A loading machine of the character described, comprising, an elevating conveyor at the front of the machine extending upwardly and rearwardly, a gathering head overlapping said conveyor, arranged in upwardly inclined relation thereto and having a shoe at its front end, and means on said head for gathering the material thereon and for moving the same therealong and onto said conveyor, said gathering means thereafter moving laterally away from said conveyor, said head being spaced above said conveyor a maximum distance in the zone where the gathering means moves laterally away from the conveyor and sufficiently to permit the material lumps to drop out of the path of said gathering means.

10. A loading machine of the character described, comprising, an elevating conveyor extending upwardly and rearwardly, a gathering head overlapping said conveyor and arranged in upwardly inclined relation thereto, and having a way therealong, and gathering elements movable along said way in rearwardly diverging paths to progress the material therealong and onto said conveyor, said gathering elements thereafter moving laterally away from said conveyor to return paths, said gathering elements being spaced above said conveyor a maximum distance in the zones where they move to return paths and sufficiently to permit the material lumps to drop out of the path of said gathering elements.

11. A loading machine of the character described, comprising, an elevating conveyor at the front of the machine extending upwardly and rearwardly, a gathering head overlapping said conveyor and arranged in upwardly inclined relation thereto, and having a way therealong, and gathering chains having picks movable along said way to progress the material therealong and onto said conveyor, said picks thereafter moving laterally away from said conveyor to return paths, said picks being spaced above said conveyor a maximum distance in the zones where they move to return paths and sufficiently to permit the material lumps to drop out of the path of said picks.

JOHN L. CLARKSON.